US011613710B2

(12) United States Patent
Roe et al.

(10) Patent No.: US 11,613,710 B2
(45) Date of Patent: *Mar. 28, 2023

(54) METHODS OF REMEDIATING LIQUID COMPOSITIONS CONTAINING SULFUR AND OTHER CONTAMINANTS

(71) Applicant: GAPS Technology, LLC, Slidell, LA (US)

(72) Inventors: Cliffton Lee Roe, Harrison Township, MI (US); Linda Schweitzer, Rochester Hills, MI (US)

(73) Assignee: Gaps Technology, LLC., Slidell, LA (US)

( * ) Notice: Subject to any disclaimer, the term of this patent is extended or adjusted under 35 U.S.C. 154(b) by 442 days.

This patent is subject to a terminal disclaimer.

(21) Appl. No.: 16/851,996

(22) Filed: Apr. 17, 2020

(65) Prior Publication Data

US 2020/0239789 A1 Jul. 30, 2020

Related U.S. Application Data

(63) Continuation-in-part of application No. 16/732,559, filed on Jan. 2, 2020, now Pat. No. 11,286,433, which (Continued)

(51) Int. Cl.
*C10G 53/12* (2006.01)
*C10G 19/02* (2006.01)
(Continued)

(52) U.S. Cl.
CPC .............. *C10G 53/12* (2013.01); *C02F 1/50* (2013.01); *C02F 1/66* (2013.01); *C10G 19/02* (2013.01);
(Continued)

(58) Field of Classification Search
None
See application file for complete search history.

(56) References Cited

U.S. PATENT DOCUMENTS 1,083,885 A * 1/1914 Lloyd ............... B01D 19/0047
236/44 R
2,592,523 A 4/1952 Ayers et al.
(Continued)

FOREIGN PATENT DOCUMENTS

AU 2012238236 B2 * 11/2017
EP 0 432 858 A1 6/1991

OTHER PUBLICATIONS

Shahrak, M.N. et al., "Removal of Hydrogen Sulfide from Hydrocarbon Liquids Using a Caustic Solution", article in Energy Sources Part A Recovery Utilization and Environmental Effects: Mar. 2015, pp. 791-798.

(Continued)

Primary Examiner — Chester T Barry
(74) Attorney, Agent, or Firm — Carrier Shende & Associates, P.C.; Joseph P. Carrier; Fulchand P. Shende (57) ABSTRACT

A treatment process for remediating $H_2S$ and other contaminants in liquids includes: partially filling a closed vessel with a contaminated liquid containing ≥5 ppm $H_2S$ with a head space above the liquid within the vessel where gasses released from the liquid from the liquid collect; separately providing a treatment composition in the head space so that the gasses from the liquid may contact the treatment composition; and permitting the contact between the vapors from the liquid and the treatment composition to continue until a collective concentration of $H_2S$ in the liquid and in the head space is <5 ppm. The treatment composition includes an aqueous solution containing at least one hydroxide compound, a collective concentration of the at least one hydroxide compound in the aqueous solution is in a range of 35-55

(Continued)

weight %, and the aqueous solution constitutes at least 80 weight % of the treatment composition.

11 Claims, 1 Drawing Sheet

Related U.S. Application Data is a continuation of application No. 16/254,089, filed on Jan. 22, 2019, now Pat. No. 10,550,337, which is a continuation of application No. PCT/US2018/064015, filed on Dec. 5, 2018, which is a continuation-in-part of application No. PCT/US2018/050913, filed on Sep. 13, 2018.

(60) Provisional application No. 62/835,875, filed on Apr. 18, 2019, provisional application No. 62/702,960, filed on Jul. 25, 2018, provisional application No. 62/661,289, filed on Apr. 23, 2018, provisional application No. 62/539,699, filed on Aug. 1, 2017.

(51) Int. Cl.

| | | |
|---|---|---|
| *C10G 29/04* | (2006.01) | |
| *C10G 29/02* | (2006.01) | |
| *C10G 29/20* | (2006.01) | |
| *C02F 1/50* | (2023.01) | |
| *C02F 1/66* | (2023.01) | |
| *C02F 103/10* | (2006.01) | |
| *C02F 103/36* | (2006.01) | |
| *C02F 101/10* | (2006.01) | |
| *C02F 103/18* | (2006.01) | |

(52) U.S. Cl.
CPC ............. *C10G 29/02* (2013.01); *C10G 29/04* (2013.01); *C10G 29/20* (2013.01); *C02F 2101/101* (2013.01); *C02F 2103/10* (2013.01); *C02F 2103/18* (2013.01); *C02F 2103/365* (2013.01); *C10G 2300/104* (2013.01); *C10G 2300/207* (2013.01); *C10G 2400/28* (2013.01)

(56) References Cited

U.S. PATENT DOCUMENTS

| | | | |
|---|---|---|---|
| 2,747,962 A * | 5/1956 | Heitz | B01D 53/34 |
| | | | 423/236 |
| 3,262,753 A | 7/1966 | Urano et al. | |
| 3,708,421 A | 1/1973 | Rippie | |
| 3,897,219 A | 7/1975 | Sibeud et al. | |
| 4,417,986 A | 11/1983 | Connaught et al. | |
| 4,746,442 A | 5/1988 | Calemma et al. | |
| 5,635,056 A | 6/1997 | Brons et al. | |
| 7,914,669 B2 | 3/2011 | Martinie et al. | |
| 9,028,679 B2 | 5/2015 | Morris | |
| 10,550,337 B2 * | 2/2020 | Roe | C10G 29/04 |
| 11,286,433 B2 * | 3/2022 | Roe | C10G 19/02 |
| 2009/0065399 A1 | 3/2009 | Kocal et al. | |
| 2010/0056404 A1* | 3/2010 | Talley | C10L 3/102 |
| | | | 507/239 |
| 2017/0001893 A1* | 1/2017 | Gurney | C02F 1/048 |

OTHER PUBLICATIONS

Mike Nicholson/Tim O'Brian, Baker Petrolite Corporation, "Hydrogen Sulfide in Petroleum", pp. 1-28 found at www.coqa-inc.org/docs/default-source/meeting-presentations/20010531H25.pdf.

Heitman et al., "Oxidation and incorporation of hydrogen sulfide by dissolved organic matter", Chemical Geology 235 (2006), pp. 12-20.

Yang et al., "Novel Process of Removal of Sulfur Dioxide by Aqueous Ammonia-Fulvic Acid Solution with Ammonia Escape Inhibition", energy&fuels article 2016, 30, pp. 3205-3218.

Pohlabein et al., "Experimental Evidence for Abiotic Sulfurization of Marine Dissolved Organic Matter", frontiers in Marine Science,, published Nov. 15, 2017, vol. 4, Article 364, pp. 1-11.

Shi X, Li Q,Wang T, Lackner KS (2017), "Kinetic analysis of an anion exchange absorbent for CO2 capture fromambient air." PLoS One 12(6): e0179828. https://doi.org/10.1371/journal. pone. 0179828, pp. 1-12.

* cited by examiner

METHODS OF REMEDIATING LIQUID COMPOSITIONS CONTAINING SULFUR AND OTHER CONTAMINANTS

CROSS-REFERENCE TO RELATED APPLICATIONS

The present application claims the benefit of priority to U.S. Provisional Patent Application No. 62/835,875, filed Apr. 18, 2019. Additionally, this application is a continuation-in-part of U.S. application Ser. No. 16/732,559, filed Jan. 2, 2020, now U.S. Pat. No. 11,286,433, which is a continuation of U.S. application Ser. No. 16/254,089, filed 22 Jan. 2019, now U.S. Pat. No. 10,550,337, which is a continuation of International Patent Application No. PCT/US2018/064015, filed on Dec. 5, 2018, which claims the benefit of priority to US Provisional Patent Application Nos. 62/661,289, filed Apr. 23, 2018 and 62/702,960, filed Jul. 25, 2018. PCT/US2018/064015 is also a continuation-in-part of International Application PCT/US2018/050913, filed 13 Sep. 2018, which claims priority to U.S. Provisional Patent Application No. 62/539,699, filed Aug. 1, 2017. The entire subject matter of these priority documents, including specification claims and drawings thereof, is incorporated by reference herein.

BACKGROUND OF THE INVENTION

1. Field of the Invention

The present disclosure relates to novel treatment compositions and treatment methods for remediating sulfur-containing compounds, including $H_2S$, and other contaminants in various liquids and gasses, including hydrocarbon based liquids and gasses. More particularly, the present disclosure relates to such treatment methods and compositions in which the contaminated liquids and gasses are chemically reacted with the treatment compositions in the treatment methods whereby almost all of the contaminants in the liquids and gasses are remediated down to very low levels that have been deemed safe in an efficient and economical manner.

2. Background

Sulfur-containing compounds including hydrogen sulfide ($H_2S$) have long been recognized as undesirable contaminants in hydrocarbon liquids such as crude oil, as well as in hydrocarbon gasses such as natural gas, and aqueous solutions such as solutions extracted from the earth along with crude oil and in natural gas. $H_2S$ is a particularly undesirable contaminant because it is highly toxic, corrosive, etc. and generally hydrocarbon liquids and gasses should contain less than four ppm $H_2S$. Remediation of $H_2S$ in hydrocarbon liquids and gasses has long been and remains a very important focus of petroleum industries around the world.

Further, many of the hydrocarbon liquids and gasses which are extracted from the ground may contain significant amounts of many other contaminants, including carbon dioxide, sodium chloride, nitrogen, etc., which should also be remediated down to low, acceptable levels to improve the quality and value of the hydrocarbon liquids and gasses.

However, the presence of these other contaminants will typically complicate the treatment required for remediating $H_2S$, and has conventionally required additional, special treatment compositions and methods beyond those used for remediating $H_2S$ in the contaminated liquids and gasses. A particular complicating factor in treating naturally occurring hydrocarbon based liquids and gasses such as crude oil and natural gas, is the fact that such liquids and gasses typically have widely varying characteristics that must be considered. For example, even in relation to one given oil well or natural gas well, the crude oil and aqueous solutions extracted therefrom have characteristics which can vary greatly, e.g., crude oil or natural gas extracted from a given well at a given time on a given day, can contain amounts of $H_2S$, as well as various types and amounts of other contaminants, which are significantly different from those contained in crude oil or natural gas extracted from the same well on the same day, but at a different time.

There are many known methods for remediating sulfur-containing compounds, including $H_2S$, from crude oil and other liquids. For example, M. N. Sharak et al., *Removal of Hydrogen Sulfide from Hydrocarbon Liquids Using a Caustic Solution*, Energy Sources, Part A: Recovery, Utilization, and Environmental Effects, 37:791-798, 2015, discuss that: the known methods include amine processes involving monoethanolamine (MEA), triazine, etc., treatment involving use of caustic material, iron oxide process, zinc oxide, molecular sieve, potassium hydroxide, and a hydrodesulphurization process; the amine treatment is usually the most cost effective choice for gas sweetening when significant amounts of acid gases exist; scrubbing of hydrogen sulfide using sodium hydroxide solution is a well established technology in refinery applications; caustic wash process is commonly used as a preliminary step in sweetening liquid hydrocarbons; and since the used solvent in this process cannot be easily regenerated, caustic scrubbers are most often applied where low acid gas (H2S) volumes must be treated.

$H_2S$ abatement achieved by a conventional amine treatment process uses an amine such as monoethanolamine (MEA) or triazine for treating $H_2S$ in crude oil. However, with the conventional amine treatment process, while the $H_2S$ may be initially remediated or abated down to acceptable levels, the sulfur contained in the treated oil may undesirably revert back to $H_2S$ over time, especially if the treated oil is heated. Somewhat similarly, it is also known that there are bacteria which ingest sulfur compounds, and hence may reduce the amounts of sulfur contaminants in hydrocarbon based liquids or contaminated aqueous solutions. However, when the bacteria die and decompose this undesirably releases the sulfur back into the hydrocarbon based liquids or contaminated aqueous solutions.

A conventional caustic treatment used to remediate $H_2S$ in crude oil involves use of a caustic aqueous solution consisting of up to 20% NaOH by weight. The water and caustic material are used to extract $H_2S$ from the crude oil into solution, dissociating $H_2S$ to HS— ion at higher pH, which shifts the equilibrium of $H_2S$ gas from oil to water. Then, the HS— can react with sodium to form NaHS (sodium bisulfide), or with $S_2^-$ to form $Na_2S$ (sodium sulfide), for example, plus water as a byproduct according to the following equations.

$$H_2S + NaOH \rightarrow NaHS + H_2O \quad (1)$$

$$NaHS + NaOH \rightarrow Na_2S + H_2O \quad (2)$$

Generally, the conventional caustic treatment methods are limited to using caustic solutions of only up to 20 weight percent NaOH because the conventional methods are designed and intended to be partly a liquid-liquid extraction, and partly a chemical reaction to convert the $H_2S$ gas to a solid sulfurous species. It is conventionally understood that a certain amount of water is needed to permit the chemical reactants to contact with the crude oil or other petroleum based liquid. The larger amounts of water contained in the conventional caustic treatment solutions permit a greater amount of liquid-liquid extraction. Also, it is known that use of excessive amounts of NaOH may damage the crude oil, as well as metal components used handling the crude oil such as pipes and tanks.

Additionally, some of the $H_2S$ may be converted into sulfur dioxide ($SO_2$) gas, e.g., upon stirring which allows air containing oxygen to get into the oil, which may be released from the treated petroleum based liquid, depending on the pressure under which the treated liquid is kept. Generally, hydroxides including NaOH are reducing agents and would not produce sulfur dioxide or elemental sulfur if the treated hydrocarbon based liquid is not exposed to air. However, if the oil is exposed to air, the sulfide/bisulfide can be oxidized to $SO_2$ or to elemental sulfur. All sulfide species are the same oxidation state (−2) and NaOH is not changing the oxidation state. Similar reactions would occur for other hydroxides included in the treatment solution. Relative to any such sulfur dioxide ($SO_2$) gas, as well as any other gases that may be released from the treated crude oil, it would be necessary as a safety measure to provide some head space in a closed tank or other closed vessel transporting the treated liquid to assure that the pressure does not get excessively high.

Recently, the present inventors have proposed other treatment compositions and processes for remediating $H_2S$ and other contaminants, as set forth in International Application Nos. PCT/US2018/050913 and PCT/US2018/064015, the contents of which International Applications are incorporated herein by reference. The previously proposed treatment compositions have proven to be very efficient for remediating sulfur-containing compounds, including $H_2S$, from hydrocarbon based liquids including crude oil, and from contaminated aqueous solutions, much more so than other conventionally known treatment compositions, and with no undesirable effects.

One of the proposed processes involves an aqueous treatment solution containing primarily a high concentration of one or more hydroxides such as sodium hydroxide (NaOH) and potassium hydroxide (KOH), e.g., collectively the hydroxides account for 35-55 weight percent, and preferably at least 45 weight percent of the treatment solution, which efficiently react with $H_2S$ to convert it to non-toxic substances. Such treatment solution according to the recent proposal is highly alkaline with a pH of 13-14. In such treatment process the treatment solution is added to the hydrocarbon based liquids or aqueous solutions being treated at appropriate dosage rates depending on multiple factors, and the hydroxide(s) in the solution efficiently remediate the $H_2S$ and other sulfur-containing compounds down to acceptable levels within relatively short time periods, and without otherwise detrimentally affecting the hydrocarbon-petroleum based liquids or contaminated aqueous solutions in any significant manner. The recently proposed treatment solution may further include one or more other components depending on the specific characteristics of the liquids being treated and other factors relating to the remediation treatment process. For example, the treatment solution may include a silicate such as potassium silicate ($K_2SiO_3$) or barium (Ba) as an antibacterial agent, but the high concentration of hydroxide(s) in the treatment solution is a primary characteristic of the solution because this is important for efficient remediation of $H_2S$ by the hydroxide(s) in the liquids being treated.

Such recently proposed treatment process is based on the inventors' discovery that the conventional treatment methods using an aqueous solution consisting of up to 20% NaOH by weight is inefficient for remediating $H_2S$, and that the $H_2S$ in contaminated liquids can be much more efficiently remediated using their proposed treatment solution containing a much higher collective concentration of one or more hydroxides. The inventors' recently proposed treatment process is not a wash type process, but involves rapid chemical reactions that greatly reduce the mass transfer of the gas to aqueous phase. What the treatment process does differently in comparison to the conventional treatment processes for remediating $H_2S$ in hydrocarbon based liquids, is to essentially reduce the initial amount of water being added via the treatment solution to the minimum effective amount.

While it is known that $H_2S$ gas is more soluble in oil than in water and that a rate-limiting step in the remediation of $H_2S$ from crude oil is typically the mass transfer of $H_2S$ from the oil phase into the aqueous phase, the inventors have discovered that: the liquid-liquid extraction aspect of the conventional methods is actually not that important in comparison to the chemical reaction aspect, e.g., because the initial solubility of $H_2S$ into water, as given by Henry's Law, is low; the larger amounts of water used in aqueous treatment solutions according to the conventional methods also function to dilute the NaOH and transfer the $H_2S$ from the hydrocarbon liquid into the water without abating the $H_2S$, which is undesirable because this slows the process needed to produce ionized HS— and $S_2$— ions that allow more of the $H_2S$ contained in the petroleum liquids into solution, and it is much more efficient and effective to remove the $H_2S$ primarily though a chemical reaction process and to a much lesser degree a liquid-liquid extraction. The present inventors have also discovered that since the chemical reactions involved between hydroxides and $H_2S$, e.g., equations (1), (2) above, produce water, the produced water can readily diffuse through the hydrocarbon based liquid being treated as it is produced because the caustic solution has good migration tendencies in many hydrocarbon based liquids and the diffusion may also be enhanced by agitation and/or heating of the treated liquids. Correspondingly, they determined that it is unnecessary to add any significant amount of water in the treatment process apart from the water in the treatment solution in order for the hydrocarbon based liquid to be effectively treated for remediation of sulfur-containing contaminants, including $H_2S$, and other contaminants therein. Relative to the inventors' discovery 1), it should be noted that equation (2) above is reversible, so large amounts of water hydrolyze the sodium sulfide ($Na_2S$) back to NaOH and NaHS. In other words, equation (2) in the reverse direction is a hydrolysis reaction.

Such recently proposed treatment process may involve use of only one hydroxide such as sodium hydroxide (NaOH) or potassium hydroxide (KOH), but may also involve use of a combination of hydroxides for more completely reacting with most or all of the sulfides in the petroleum based liquids, noting that there are more than 300 species of sulfur compounds, although hydrogen sulfide $H_2S$ is by far the main contaminant that must be remediated. For example, some other species of undesirable sulfur compounds include ethyl mercaptan ($CH_3CH_2SH$), dimethyl sulfide ($C_2H_6S$), isobutyl mercatan ($C_4H_{10}S$) and methyl thiophene ($C_5H_6S$). Sodium hydroxide is very effective for use in the treatment solution because it does not harm the petroleum based liquids when used in appropriate amounts, and is relatively inexpensive. Potassium hydroxide is more effective than sodium hydroxide for reacting with some species of sulfides. Hence, the treatment process involving potassium hydroxide (KOH) together with the sodium hydroxide achieves a more complete reaction with all of the sulfides contained in the hydrocarbon based liquids in comparison to just using a concentrated solution of sodium hydroxide.

In such proposed treatment process for remediating contaminated liquids, the treatment solution may be added at a standard dosage rate of 0.25-6.0 ml of the treatment solution/liter of the liquid being treated, preferably 1.0-5.0 ml of the treatment solution/liter of the liquid being treated, which corresponds to approximately 250-6000 ppm of the treatment solution in the liquid being treated based on the discussed concentration of hydroxide(s) in the solution. The discussed standard dosage rate is generally effective for remediating $H_2S$ concentrations up to down to safe, acceptable levels. 40,000 ppm $H_2S$ may be experienced in some hydrocarbon based liquids such as crude oil, although contaminated aqueous solutions typically have a much lower $H_2S$ concentration such as 2000 ppm or less. If the amount of the treatment solution added is below 0.25 ml/liter of liquid being treated, sufficient remediation of $H_2S$ may not be archived, and the reactions between the treatment solution and the sulfide compounds in the hydrocarbon based liquid may not proceed quickly and/or efficiently. If the concentration of $H_2S$ is higher than 40,000 ppm it may be necessary to increase standard dosage amount of the recently proposed treatment solution appropriately, which may generally involve linear scalability. Dosage levels above 6.0 ml of the treatment solution/liter of the liquid being treated generally do not further reduce $H_2S$ levels in the treated liquids where reaction times are not a consideration, but can advantageously reduce required reaction times if so desired.

Within the discussed standard dosage rate range, a most appropriate dosage amount of the treatment solution to be added to a contaminated liquid during the treatment process may be determined based on a few considerations, e.g., the amounts of $H_2S$ and other contaminants in the liquid that need to be remediated, other characteristics of the liquid including its viscosity or API density (the term API as used herein, is an abbreviation for American Petroleum Institute), desired reaction rate/time, specific result desired including whether precipitate(s) are to be formed and released from the liquid, and whether the treated liquid is being mixed and/or heated during the treatment process. For example, mixing at moderate to high speeds to rapidly disperse the treatment solution throughout the treated liquid may reduce required reaction time by 50%, whereas some highly viscous liquids such as bunker fuel may require heating to permit proper dispersion of the treatment solution therein. The appropriate dosage rate is substantially, linearly scalable in relation to most or all of the various characteristics within the standard dosage rate range.

Advantageously, the recently proposed treatment process is generally efficient and effective as long as the amount of the treatment solution added is within the discussed standard dosage rate range, whether or not the amount of treatment solution added is the most appropriate dosage amount for the given liquid being treated. Further, use of higher amounts of the treatment solution may be desirable in some situations, and generally will not cause any significant problems or complications, although higher dosage amounts generally tend to cause precipitate(s) to be generated and released from the treated liquids. For example, the inventors have further determined that if an intentionally excessive dosage of the recently proposed treatment solution is added to a liquid being treated such as 2-5 times the standard dosage rates discussed above, this will likely cause remediated contaminants and other contaminants in the treated liquid to precipitate out of the treated liquid, which may be desirable in some situations. Also, depending on how much of the treatment solution is used in excess of the standard dosing rate, this may generate different precipitates which separate out of the treated liquid so that the outcome may be controlled in desired manners, e.g., at 2 times the standard dosing rate a hydrate of sodium sulfide such as $Na_2S \cdot 9H_2O$ may precipitate out of the treated liquid according to the reaction (2) above, while at a higher dosage rate of 3 to 5 times the standard dosage rate, this may cause elemental sulfur to precipitate out of the treated liquid. Otherwise, the excess dosages of hydroxides in the treatment process will increase the cost of the treatment, but generally do not have any significantly adverse effects on the treated hydrocarbon based liquids and aqueous solutions. However, application of a very excessive amount of the solution, e.g., ten times the normal amount, may render the treated petroleum based liquid caustic which could be damaging to metals such as steel and aluminum used for containing and transporting the treated liquids.

Reaction times for the inventors' recently proposed treatment process are typically within a relatively short time period such as 15 minutes-24 hours after such treatment solution is added to the liquid at the discussed dosage rate, whether the liquid being treated is a hydrocarbon based liquid such as crude oil or a contaminated aqueous solution. Within such time period, the hydroxide(s) in the solution remediate the $H_2S$ and other sulfur based contaminants down to safe, acceptable levels such as 5 ppm or less, and without generating or releasing any particularly harmful substances. For example, when the treatment solution includes sodium hydroxide (NaOH) as the primary hydroxide therein, e.g., at least 90% of all hydroxides in the solution, much of the $H_2S$, e.g., at least 60% is converted into sodium bisulfide (NaHS) according to the reaction (1) above, which remains dissolved in the treated petroleum liquid, and does not create any significant problems that would need to be addressed. Additionally, some of the $H_2S$ may be converted into sulfur dioxide ($SO_2$) gas which may be released from the treated petroleum based liquid, depending on the pressure at which the treated liquid is kept.

Very desirably, the proposed treatment process is generally not reversible in relation to the $H_2S$ and other sulfur contaminants which have been remediated, e.g., even if the treated liquid is heated up to 180° F. for a period of days or weeks, any remediated sulfur compounds remaining in the treated liquids do not revert back to $H_2S$. Some conventional treatment processes for remediating $H_2S$ are undesirably reversible, including the conventional amine treatment process which uses an amine such as MEA or triazine for treating $H_2S$ in crude oil. For example, with the conventional amine treatment process, while the $H_2S$ may be initially remediated or abated down to acceptable levels, the sulfur contained in the treated oil may undesirably revert back to $H_2S$ over time, especially if the treated oil is heated. Conversely, when crude oil which initially contained about 1000 ppm $H_2S$ was treated according to a treatment process using the treatment solution according to the inventors' recent proposal at a dosing rate of 3 ml/liter of oil and the $H_2S$ was abated down to about 0 ppm and essentially none of the sulfur precipitated out of the oil, the treated crude oil was heated up to 180-300° F. or 82.2-148.9° C. for periods of hours, days and weeks, the resulting oil still contained about 0 ppm $H_2S$. Essentially none of the sulfur compounds(s) in the treated liquid reverted back to $H_2S$.

According to a second proposal by the present inventors, the first proposed treatment composition and process are modified or supplemented such that the contaminants in the treated liquids are not only remediated, but remediated in such a manner that essentially no precipitates or scale are generated in the treated liquids. In the first proposed treatment process if only a standard dosing rate of the treatment solution is added to a liquid being treated, there may be little or no precipitate(s), scaling or the like formed from the treated liquids, but even small amounts of precipitate(s), scaling or the like may be undesired or unacceptable in some situations. One particular application in which it is very important to assure that no precipitates, scale and the like will be generated from the treated hydrocarbon based liquids is when crude oil directly from the ground is being transported via tanker truck or other vessel to a major pipeline, which then transports the crude oil to a refinery. The major pipeline generally will not accept crude oil containing more than 5 ppm $H_2S$. By treating the crude oil with a standard dosage of the treatment solution according to the inventors' first proposal, this would be effective to reduce the $H_2S$ content down to 5 ppm or less, but it is possible that there would be some precipitates and/or scaling formed or deposited on surfaces of the tanker truck or other vessel transporting the crude oil, which would be undesirable.

According to the inventors' second recent proposal, an appropriate amount of organic acid(s) such as fulvic acid and the viscosity of the liquid and will also reduce the amount of time required for properly remediating the $H_2S$ and other contaminants in the liquid. The dosage amount of organic acid(s) is substantially, linearly scalable within the discussed range based on these factors. Additionally, a small amount of monoethanolamine or MEA ($C_2H_7NO$) may be added to the treated liquid, along with the organic acid(s), e.g., an amount corresponding to a concentration of 0.5-15 ppm, and preferably 1.0-10 ppm, of the MEA in the hydrocarbon based liquid or aqueous solution being treated. The small amount of MEA acts as an anti-scaling agent in the second proposed treatment process/composition.

Fulvic acid is actually a family of organic acids, but may typically be identified as 1H,3H-Pyrano[4,3-b][1]benzopyran-9-carboxylic acid, 4,10-dihydro-3,7,8-trihydroxy-3-methyl-10-oxo-; 3,7,8-trihydroxy-3-methyl-10-oxo-1,4-dihydropyrano[4,3-b]chromene-9-carboxylic acid, with an average chemical formula of $C_{135}H_{182}O_{95}N_5S_2$ and molecular weights typically in a range of 100 to 10,000 g/mol. Somewhat similarly, humic acid is a mixture of several molecules, some of which are based on a motif of aromatic nuclei with phenolic and carboxylic substituents, linked together, and the illustration below shows a typical structure. Molecular weight (size) of humic acid is typically much larger than that of fulvic acid, and can vary from 50,000 to more than 500,000 g/mol.

humic acid is also added to the treated liquid at a dosage rate that will typically result in a concentration of the organic acid(s) in the liquid being treated being in a normal range of 0.01-10 ppm, preferably 0.1-3 ppm, whether the liquid is a hydrocarbon based liquid or contaminated aqueous solution. Within such range, the most appropriate dosage rate of the organic acid(s), like the most appropriate dosage rate of the first recently proposed treatment solution, largely depends on: 1) the amount of H7S and other sulfur containing contaminants in the liquid being treated; 2) the viscosity of the liquid; and 3) the amount of time permitted for reacting the treatment solution with the liquid being treated, although heating and/or mixing of the liquid being treated will reduce In the treatment process according to the second proposal the organic acid(s) which are also added to the liquids being treated assure that substantially no precipitate(s), scaling or the like will be formed from the treated liquids while they are being treated, transported and/or stored for a period of time such as hours, days or weeks. Further, to any extent that there is a increased likelihood that precipitate(s), scaling or the like may be formed in a treated liquid, e.g., the treated liquid contains an especially high content of $H_2S$ and other sulfides requiring a larger dosage of the treatment solution according to the inventors' recent proposal and/or the liquid being treated contains a high content of rag components such as organic matter, an increased amount of the organic acid(s) may be added to the treated liquid beyond the normal range of 0.01-10 ppm to assure that substantially no precipitate(s), scaling or the like will be formed.

The inventors' recently proposed treatment processes may be conveniently carried out essentially wherever the contaminated liquids may be present, e.g., in open bodies of the liquids, in conjunction with a transport tanker or other vessel in which the liquids are being transported, at a wellhead where the liquids are being extracted from the ground, in open or closed tanks, in an enclosed pipeline through which the contaminated water or other liquid is being transported, etc.

While the known treatment methods and compositions for remediating sulfur-containing compounds, including $H_2S$, from hydrocarbon based liquid and aqueous solutions, especially the methods and treatment compositions according to the present inventors' recent proposals are generally effective for remediating the $H_2S$ and other contaminants in the liquids, they remain to be improved on, relative to treating contaminated liquids, and particularly in terms of improved efficiency and reduced costs.

Thus, there remains in the art a need for treatment compositions and treatment methods for remediating sulfur-containing compounds, including $H_2S$, from crude oil, natural gas, other hydrocarbon based liquids and gasses, and contaminated aqueous solutions, where such treatment solutions and methods are improved in terms of effectiveness in completely remediating the sulfide compounds, as well as in terms of efficiency in quickly remediating the sulfide compounds and other contaminants at a reasonable cost, and with good flexibility in the ability to perform the treatment method at essentially any location, including directly at a well head or an oil field where crude oil or natural gas is being extracted.

SUMMARY OF THE INVENTION

An object of the present invention is to at least partially satisfy the discussed need.

The present inventors have carefully investigated caustic treatment of petroleum based liquids and gasses including crude oil and natural gas, as well as other contaminated liquids and gasses for removing $H_2S$ and other contaminants therefrom, and have discovered some modified or additional treatment compositions and treatment methods for efficiently remediating the contaminants in such liquids and gasses.

A discovery made by the inventors relates to the fact that at atmospheric pressure and temperature $H_2S$ will primarily exist in vapor phase, rather than in a petroleum based liquid or water based liquid, and that for many substances, including $H_2S$, the reactivity of the substances is much greater in the vapor phase than in the liquid phase. Particularly, the inventors have discovered that their previously proposed treatment compositions, and modifications of same, may also be very effectively used for remediating $H_2S$ and other contaminants in the liquids being treated without fully mixing—combining the treatment compositions into the contaminated liquids, but instead by providing the treatment compositions in such a manner that gaseous $H_2S$ and other gaseous contaminants released from the contaminated liquids may contact the treatment solutions and be remediated via such contact.

According to a first aspect of the present invention there is provided a treatment process for remediating $H_2S$ and other contaminants in contaminated liquids comprising steps of: disposing an amount of a contaminated liquid containing ≥5 ppm $H_2S$ in a closed or closable vessel such that the liquid partially fills the vessel and a head space is defined within the vessel above the liquid where vapors from the liquid collect; providing a treatment composition in the head space such that the vapors from the liquid may contact the treatment composition; and permitting the contact between the vapors from the liquid and the treatment composition to continue until a collective concentration of $H_2S$ in the liquid and in the head space is <5 ppm. Pressure within the vessel may be equal to or less than 20 atmospheres, but typically may be about atmospheric pressure, while temperature within the vessel may be ambient temperature or higher but not so high as to cause the liquid being treated to combust or be damaged, e.g., 0-75° C.

Although the vessel is closed or closable, the treatment process may typically be carried out at a temperature and pressure which substantially corresponds to standard temperature and pressure, e.g., a temperature of 20-25° C. and a pressure of around one atmosphere. At such temperature and pressure essentially all of the $H_2S$ and some of the other contaminants in the liquids will tend to be released from the liquids as gasses or vapors and will collect in the head space of the vessel. Heating the liquid being treated to a temperature above 25° C. and/or reducing pressure within the vessel below one atmosphere would increase the rate at which the $H_2S$ and some of the other contaminants in the liquids will tend to be released from the liquids as vapors, and hence shorten the time required to fully remediate the contaminants.

The treatment compositions that may be used according to the present invention include those previously proposed by the inventors as disclosed in International Application Nos. PCT/US2018/050913 and PCT/US2018/064015, and modifications of same. For example, similar to the previously proposed treatment compositions, the treatment composition according to an exemplary embodiment of the present invention may primarily contain, e.g., constituting at least 80 weight % and preferably at least 90 weight % of the treatment composition, an aqueous hydroxide solution of at least one hydroxide compound, wherein a collective concentration of the at least one hydroxide compound in the aqueous hydroxide solution is in a range of 35-55 weight %, and preferably 45-55 weight %, while an amount of the treatment composition provided in the head space may be ≤1% volume of the amount of the contaminated liquid. Under such conditions the gasses/vapors of $H_2S$ and other contaminants as released from the crude oil or other liquid will readily react with the hydroxide compound(s) of the treatment composition and be remediated down to safe, acceptable levels such as 5 ppm or less within 1-3 hours. The reactions between the hydroxide compound(s) and $H_2S$ and other targeted contaminants are essentially the same as discussed in PCT/US2018/050913 and PCT/US2018/064015.

A concentration of the hydroxide compound(s) in the aqueous hydroxide solution below 35 wt % may be used, but the time required to fully remediate the contaminants would be increased. On the other hand, it may be desirable to increase the amount of the treatment composition to ≥1% volume if the contaminated liquid includes any significant amount of $CO_2$, e.g., ≥250 ppm, because the $CO_2$ will also be released from the contaminated liquid and hydroxides react with the $CO_2$ as well as with $H_2S$ and other sulfur based contaminants. Very desirably, once a contaminated liquid is fully remediated by the process according to the first aspect of the present invention, the treatment composition used for the remediation may not be fully spent, and may be used again for treating additional quantities of contaminated liquids, either as is or with a supplemental amount of the treatment composition added thereto. Thus, the treatment process according to the first aspect of the present invention is more cost effective that the present inventors' previously proposed treatment process in which a similar amount of treatment composition is directly, fully added to the contaminated liquid. Also, it may be appropriate to include a greater amount of the treatment composition in the head space of the reaction chamber than 1 volume % as this would not cause any detrimental reactions, whereas the same treatment composition may be subsequently used/reused for treating additional amount(s) of contaminated liquids. Hence, using the greater amount of the treatment composition above 1 volume % should not increase the cost of the treatment process because the same composition can be used repeatedly and the cost will be spread out over the number of times the treatment composition is used.

The treatment composition according to the first aspect of the invention may include other components of the treatments solutions as disclosed in PCT/US2018/050913 and PCT/US2018/064015, including an organic acid such as fulvic acid and humic acid which help to prevent the remediated $H_2S$ and other contaminants from precipitating out of the treated liquids and gasses, MEA which provides an anti-scaling effect, a silicate or barium which provide an anti-bacterial effect, etc. These additional components may be added in similar quantities or proportions as discussed in PCT/US2018/050913 and PCT/US2018/064015 and may provide similar beneficial effects in the treatment process according the first aspect of the present invention as they do when the treatment composition is fully added to/combined with the contaminated liquids. For example, a treatment composition according to an embodiment of the present invention may include organic acid(s) such as fulvic acid and humic acid in a collective amount of 0.01-4.0 wt %, and preferably 0.05-2.0 wt %, of the treatment composition. Similarly, MEA may be added to the treatment composition in an amount of 0.01-4.0 wt %, preferably 0.05-2.0 wt %.

The treatment composition according to the first aspect of the invention may also include other components besides those of the treatments solutions as disclosed in PCT/US2018/050913 and PCT/US2018/064015. For example, the treatment composition may include a chelating agent such as ethylenediaminetetraacetic acid (EDTA), a surfactant, a buffering agent, etc. EDTA may be added at 0.5-50 ml/liter of composition, while a surfactant and a buffering agent may each be added at 0.01 to 1 ml/liter of treatment composition.

EDTA is particularly effective for controlling the pH of the treatment composition to remain above 8 in that EDTA is a alkali base with a PH of 14 and slows the decrease of the pH of the treatment composition as it is used over a period of time. This is advantageous because the high pH favors reaction between the hydroxide compound(s) and the $H_2S$ in the natural gas as discussed above, such that a given amount of the treatment composition can be effectively used for remediating more of the $H_2S$ in comparison to an equal amount of treatment composition which does not include EDTA. In other words, the EDTA or other chelating agent effectively extends the useful life of the treatment composition. Incidentally, EDTA has been used in previous times as a primary reactant in a method of mitigating $H_2S$. However, the required molar reaction time is long and the molar reaction ratio is 1 mole EDTA to 1 mole $H_2S$, such that high concentrations of $H_2S$ would require large doses of chemical for a long treatment period, which is not well suited to treatment of contaminated natural gas containing significant amounts of $H_2S$. Addition of a surfactant such as sodium lauryl sulfate and buffering agent such as potassium carbonate may enhance the effectiveness of the other components.

According to a second aspect of the present invention, in addition to the first aspect, the treatment composition is aqueous based, the treatment composition contains more than one hydroxide compound, e.g., the treatment composition may contain substantially equal amounts of NaOH and KOH at a collective concentration of 35-55 wt %, and a pH of the treatment solution is ≥9.0 and preferably ≥13.

According to a third aspect of the present invention, in addition to the first or second aspect, wherein the step of providing the treatment composition in the head space involves placing the treatment solution in an open container and disposing the open container with the treatment composition in the closed or closable vessel such that the vapors from the liquid as collected in the head space may contact the treatment composition.

According to a fourth aspect of the present invention, in addition to the first or second aspect, wherein the step of providing the treatment composition in the head space involves forming a gaseous mixture containing fine droplets of the treatment composition and flowing the gaseous mixture into the head space of the closed or closable vessel. Such gaseous mixture may be continuously circulated or re-circulated through the headspace during the treatment process, and if the gaseous mixture is re-circulated it may be supplemented with an additional amount of the gaseous mixture which has not been re-circulated so as to maintain the amount and/or characteristics of the treatment composition in the headspace at or above a predetermined level.

The treatment method according to the first-fourth aspects of the present invention is very advantageous because it can quickly and efficiently remediate the $H_2S$ and other contaminants in the liquids and in the head space down to safe, acceptable levels, e.g., 1 ppm, with 1-3 hours, and does so while using significantly less of the treatment solution than would be required if the treatment composition was fully mixed into a contaminated liquid according to the inventors' previous proposals. For example, if the treatment composition is disposed in an open container for contact with vapors of $H_2S$ and other contaminants in the head space of the closed or closable vessel, the components of the treatment composition will typically remain at or near their original concentrations after the content of $H_2S$ and other contaminants has been remediated down to acceptable levels, even if the original concentrations of $H_2S$ and other contaminants in the treated solutions were relatively high, e.g., concentration of $H_2S$ in a range of 20,000-40,000 ppm. This permits such treatment composition to be used again for treating additional amount(s) of contaminated liquids. However, the treatment composition does lose some of its strength/potency in each remediation process, and after the treatment composition has been used a number of times for treated contaminated liquids, the concentrations of components of the treatment composition will gradually be reduced and the pH of the solution will gradually reduce, and at some point the treatment composition will not be sufficiently effective for continued use and will have to be replaced or supplemented with additional, fresh treatment composition.

On the other hand, if the treatment composition is applied as a gaseous mixture containing fine droplets of the treatment liquid which flows into the head space of the closed vessel, the amount of the treatment composition required for remediating the $H_2S$ and other contaminants in the liquids being treated may be far less than 1% volume of the amount of the contaminated liquid, e.g. 0.01-0.1% volume. Hence, the treatment process using the treatment composition is applied as a gaseous mixture is also very efficient in comparison to the inventors' previous proposal in which the treatment composition is fully added to/combined with a contaminated liquid.

Another advantage achieved according to the second aspect of the invention is that the treatment composition containing multiple different hydroxide compounds at a collective total concentration of 35-55 wt %, e.g., sodium hydroxide (NaOH) and potassium hydroxide (KOH) in approximately equal weight percentages, is unexpectedly much more reactive than a similar treatment solution containing the same total concentration of these hydroxides in a range of 35-55 wt %, but in a ratio of 80% NaOH/20% KOH.

INTENT OF DISCLOSURE

Although the following disclosure of exemplary embodiments of the invention offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

DETAILED DESCRIPTION OF PRESENT EXEMPLARY EMBODIMENTS

Exemplary embodiments of the present invention will be described below. Primary aspects of the present invention involve use of novel treatment compositions in treatment processes for contaminated liquids wherein the treatment compositions are not fully combined/mixed with the contaminated liquids.

Processes for Treating Contaminated Liquids Involving Treatment Compositions not Fully Combined with the Liquids Again, the present inventors have carefully investigated caustic treatment of petroleum based liquids including crude oil, as well as other contaminated liquids, for removing $H_2S$ and other contaminants therefrom, and have discovered that treatment compositions such as those they have previously proposed in PCT/US2018/050913 and PCT/US2018/064015, as well as modifications thereof, may be very effectively and efficiently used to treat contaminated liquids containing $H_2S$ and other sulfur based contaminants without fully mixing or combining the treatment composition with the contaminated liquids. Instead the treatment compositions are separately provided in a closed space/reaction chamber with the contaminated liquids such that vapors of the $H_2S$ and other contaminants which are naturally released from the contaminated liquids at low pressures such as atmospheric pressure may contact the treatment compositions and be remediated by reacting with same.

This discovery made by the inventors relates to the fact that at atmospheric pressure and temperature $H_2S$ will primarily exist in vapor phase, rather than in a petroleum based liquid or water based liquid, and that for many substances such as $H_2S$, the reactivity of the substances is much greater in the vapor phase than in the liquid phase. Particularly, the inventors have discovered that by providing the treatment compositions separately from the contaminated liquids within a closed chamber in such a manner that $H_2S$ vapor coming out of the contaminated liquids may contact the treatment solutions, this can be sufficient for fully remediating the $H_2S$ and other sulfur based contaminants, while using much less of the treatment compositions than if the treatment compositions are fully combined with the contaminated liquids. For example, according to the inventors' previous proposals a typical dosage of treatment composition used would be within a range of 0.25-6.0 ml/liter of the liquid being treated, preferably within a range of 1.0-5.0 ml/liter of the liquid being treated, whereas according to the exemplary embodiment of the present invention may be reduced to ½, ⅕ th or even ¹⁄₁₀th of the amounts used in the previous proposal where the treatment composition is fully added to the contaminated liquid. The reactions between the hydroxide compound(s) and $H_2S$ and other targeted contaminants are essentially the same as discussed in PCT/US2018/050913 and PCT/US2018/064015. Under such conditions the vapors of $H_2S$ and other contaminants as released from the crude oil or other liquid will readily react with the hydroxide compound(s) of the treatment composition and be remediated down to safe, acceptable levels such as 5 ppm or less within 1-3 hours. Hence, the treatment process according to the exemplary embodiment of the present invention may achieve a correspondingly lower cost and greater efficiency that the inventors' previously proposed treatment processes.

Generally, the primary component of the previously proposed treatment solutions as disclosed in PCT/US2018/050913 and PCT/US2018/064015 is an aqueous hydroxide solution containing at least one hydroxide compound, wherein the aqueous hydroxide solution constitutes at least 80 weight % and preferably at least 90 weight % of the treatment composition, and wherein the collective concentration of the at least one hydroxide compound in the aqueous hydroxide solution is in a range of 35-55 wt %. A pH of the treatment composition may be ≥9.0, and preferably ≥13.0. These previously proposed treatment compositions may also be used in the exemplary embodiment of the treatment process according to the present invention, although the inventors have determined that specific formulations of the previously proposed compositions may work especially well in the present treatment process. The treatment composition according to this embodiment of the present invention may include a single hydroxide compound or a combination of multiple different hydroxide compounds, including sodium hydroxide (NaOH), potassium hydroxide (KOH), magnesium hydroxide (Mg(OH)$_2$), lithium hydroxide (LiOH) and manganese hydroxide (Mn(OH)$_2$, Mn(OH)$_4$) in various ratios, but with a collective total hydroxide concentration of 35-55 wt %, and preferably 45-55 wt %. Incidentally, however, the inventors have also found that if the treatment composition used in the treatment process according to the present invention contains substantially equal amounts of NaOH and KOH as the hydroxide compounds of the treatment composition, the treatment composition is unexpectedly much more reactive, e.g., three times more reactive, than a similar treatment composition containing the same total concentration of these hydroxide compounds, but in a ratio of 80% NaOH/20% KOH.

The exemplary embodiment of the present treatment composition may include other components such as other components used in the previously proposed treatment solutions. For example, the treatment composition may include one or more organic acids such as fulvic acid and humic acid which help to prevent the remediated $H_2S$ and other contaminants from precipitating out of the treated liquids, MEA which provides an anti-scaling effect, an anti-bacterial agent such as a silicate such as potassium silicate or barium, other possible components of the treatments solutions as disclosed in PCT/US2018/050913 and PCT/US2018/064015, etc. The exemplary embodiment of the present treatment composition may include other components, as well, including EDTA which helps to improve molar reactivity of the hydroxide compound(s), a surfactant, a buffering agent, etc. However, it is not clear if these other components provide the same effects and to the safe extent in the treatment according to the exemplary embodiment of the present invention as they provide in the treatment processes of PCT/US2018/050913 and PCT/US2018/064015, again, because the present treatment composition is not fully mixed into the contaminated liquids in the treatment process of the present invention, unlike how the treatment solutions are used in the treatment processes disclosed in PCT/US2018/050913 and PCT/US2018/064015.

A concentration of the hydroxide compound(s) in the aqueous hydroxide solution of the treatment composition below 35 wt % may be used, but the time required to fully remediate the contaminants would likely be increased. On the other hand, it may be desirable to increase the amount of the treatment composition to ≥1% volume if the contaminated liquid includes any significant amount of $CO_2$, e.g., ≥250 ppm, because the $CO_2$ will also be released from the contaminated liquid and hydroxides react with the $CO_2$ as well as with $H_2S$ and other sulfur based contaminants. Generally, once a contaminated liquid is fully remediated by the process according to the first aspect of the present invention, the treatment composition used for the remediation may not be fully spent, and may be used again for treating additional quantities of contaminated liquids, either as is or with a supplemental amount of the treatment composition added thereto. Thus, the treatment process according to the first aspect of the present invention is more cost effective that the present inventors' previously proposed treatment process in which a similar amount of treatment composition is directly, fully added to the contaminated liquid. Also, it may be appropriate to include a greater amount of the treatment composition in the head space of the reaction chamber than 1 volume % as this would not cause any detrimental reactions, whereas the same treatment composition may be subsequently used/reused for treating additional amount(s) of contaminated liquids. Hence, using the greater amount of the treatment composition above 1 volume % should not increase the cost of the treatment process because the same composition can be used repeatedly and the cost will be spread out over the number of times the treatment composition is used.

The treatment composition according to the first aspect of the invention may include other components of the treatments solutions as disclosed in PCT/US2018/050913 and PCT/US2018/064015, including an organic acid such as fulvic acid and humic acid which help to prevent the remediated $H_2S$ and other contaminants from precipitating out of the treated liquids and gasses, MEA which provides an anti-scaling effect, a silicate or barium which provide an anti-bacterial effect, etc. These additional components may be added in similar quantities or proportions as discussed in PCT/US2018/050913 and PCT/US2018/064015 and may provide the same beneficial effects in the treatment process according the first aspect of the present invention as they do when the treatment composition is fully added to/combined with the contaminated liquids. For example, a treatment composition according to an embodiment of the present invention may include organic acid(s) such as fulvic acid and humic acid in a collective amount of 0.01-4.0 wt %, and preferably 0.05-2.0 wt %, of the treatment composition. Similarly, MEA may be added to the treatment composition in an amount of 0.01-4.0 wt %, preferably 0.05-2.0 wt %.

The treatment composition according to the first aspect of the invention may also include other components besides those of the treatments solutions as disclosed in PCT/US2018/050913 and PCT/US2018/064015. For example, the treatment composition may include a chelating agent such as ethylenediaminetetraacetic acid (EDTA), a surfactant, a buffering agent, etc. EDTA may be added at 0.5-50 ml/liter of composition, while a surfactant and a buffering agent may each be added at 0.01 to 1 ml/liter of treatment composition.

EDTA is particularly effective for controlling the pH of the treatment composition to remain above 8 in that EDTA is a alkali base with a PH of 14 and slows the decrease of the pH of the treatment composition as it is used over a period of time. This is advantageous because the high pH favors reaction between the hydroxide compound(s) and the $H_2S$ in the natural gas as discussed above, such that a given amount of the treatment composition can be effectively used for remediating more of the $H_2S$ in comparison to an equal amount of treatment composition which does not include EDTA. In other words, the EDTA or other chelating agent effectively extends the useful life of the treatment composition. Incidentally, EDTA has been used in previous times as a primary reactant in a method of mitigating $H_2S$. However, the required molar reaction time is long and the molar reaction ratio is 1 mole EDTA to 1 mole $H_2S$, such that high concentrations of $H_2S$ would require large doses of chemical for a long treatment period, which is not well suited to treatment of contaminated natural gas containing significant amounts of $H_2S$. Addition of a surfactant such as sodium lauryl sulfate and buffering agent such as potassium carbonate may enhance the effectiveness of the other components.

According to an exemplary embodiment of the present invention there is provided a treatment process for remediating $H_2S$ and other contaminants in contaminated liquids which includes steps of: disposing an amount of a contaminated liquid containing ≥5 ppm $H_2S$ in a closed or closable vessel such that the liquid partially fills the vessel and a head space is defined within the vessel above the liquid where any gasses discharged from the liquid may collect; providing a treatment composition in the head space such that the gasses from the liquid may contact the treatment composition; and permitting the contact between the gasses from the liquid and the treatment composition to continue until a collective concentration of $H_2S$ in the liquid and in the head space is <5 ppm. Again, the treatment composition used in this treatment process may have a composition as those disclosed in PCT/US2018/050913 and PCT/US2018/064015, or a variation of the previously discloses compositions, as discussed above.

Figure 1:
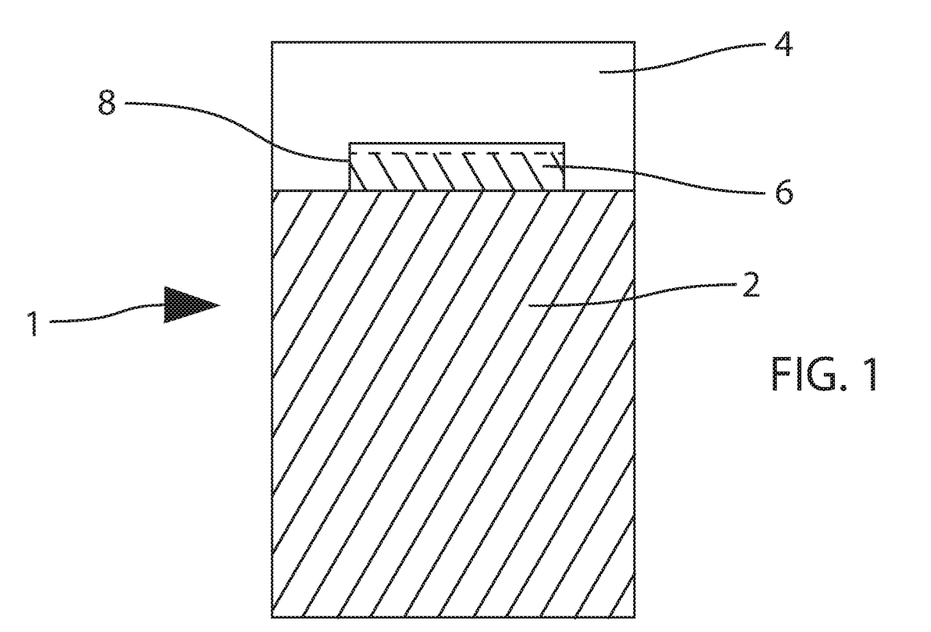
FIG. 1 is a schematic diagram of a reaction chamber which may be used in an exemplary embodiment of the present invention.

The step of providing the treatment composition in the head space of the reaction chamber may be accomplished in various manners according to the exemplary embodiment of the present invention. With reference to FIG. 1, there is shown a schematic diagram of a vessel 1 having a reaction chamber therein, which may be used in an exemplary embodiment of the present invention. The vessel 1 is closed or closable such that no gas or liquid may unintentionally escape from the reaction chamber during a treatment process, noting that gaseous $H_2S$ is very toxic to humans, and a contaminated liquid 2 such as crude oil may be loaded into the vessel so that it occupies much of the space in the vessel, while a head space 4 is defined at the upper portion of the closed vessel above the liquid such that the gaseous $H_2S$ and other gaseous contaminants released from the liquid may collect in the head space. An amount of an aqueous based treatment composition 6 according to the exemplary embodiment of the present invention may be placed in an open container 8 which is disposed in the closed vessel such that the vapors of $H_2S$ and other contaminants which collect in the head space 4 may contact the treatment composition. The amount of the treatment composition used may be ≤1% in comparison to the volume of the contaminated liquid being treated, even as low as, e.g. 0.01-0.1. % volume.

Figure 2:
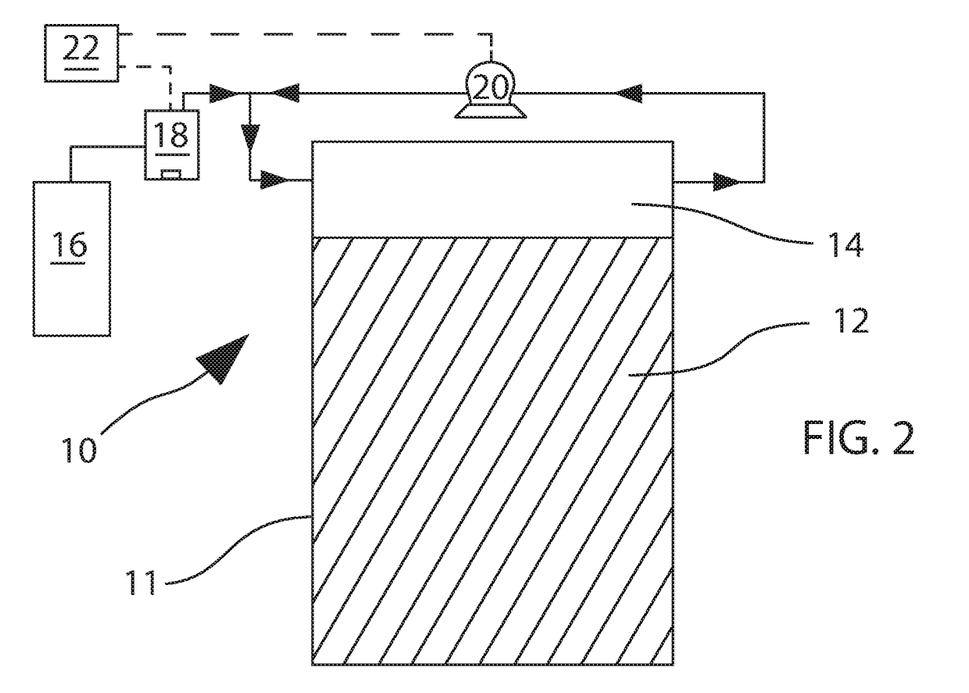
FIG. 2 is a schematic diagram of a reaction chamber which may be used in another exemplary embodiment of the present invention.

As another example, a closable system 10 such as shown in FIG. 2 may be used. The system 10 includes a closed or closable vessel 11 having a reaction chamber therein in which an amount of a contaminated liquid 12 such as crude oil may be loaded so that it occupies much of the space in the vessel, while a head space 14 is defined at an upper portion of the vessel above the liquid such that the gasses of $H_2S$ and other contaminants released from the liquid may collect in the head space. The system may further include a supply 16 of a treatment composition according to the exemplary embodiment of the present invention, a device 18 such as an ultrasonic humidifier for generating a gaseous mixture containing fine droplets of the treatment composition, a pump 20 and a controller 22 such as a microcomputer programmed to control operations of the system. For example, the controller may cause the system to generate a gaseous mixture containing fine droplets of the treatment composition and flow the gaseous mixture into the head space 14. The gaseous mixture may be circulated and re-circulated through the head space and, if necessary, additional fine droplets of the treatment composition may be added to the circulating gaseous mixture during the treatment process.

An effective amount of the treatment composition to be provided in the head space according to either of the arrangements in FIGS. 1-2 may be ≤1% volume compared to the volume of contaminated liquid being treated, and even less than 0.1% volume of the amount of the contaminated liquid being treated, and may be significantly less that the amounts of the treatment solutions used in the treatment processes disclosed in PCT/US2018/050913 and PCT/US2018/064015, again, because the treatment compositions are not fully mixed into the treated liquids. However, it may be desirable to increase the amount of the treatment composition if the contaminated liquid includes a significant amount of $CO_2$, e.g., at least 250 ppm, because hydroxides in the treatment composition react with the $CO_2$ as well as with $H_2S$ and other contaminants. With the embodiment of FIG. 1 involving an open container of treatment composition, once a contaminated liquid is fully remediated by the treatment process according to the embodiment of the present invention, the treatment composition used for the remediation may still possess much or most of its original reactivity, and may be used again for treating additional quantities of contaminated liquids, either as is or with a supplemental amount of the treatment composition added thereto. Thus, the treatment process according to the first aspect of the present invention is more cost effective that the present inventors' previously proposed treatment process in which a similar amount of treatment composition is directly, fully added to the contaminated liquid. Also, it may be appropriate to include an amount of the treatment composition in the head space of the reaction chamber ≥1 volume % as this should shorten the time necessary to remediate the $H_2S$ and other contaminants in the treated liquid and would not cause any detrimental reactions, whereas the same treatment composition may be subsequently used/reused for treating additional amount(s) of contaminated liquids. Hence, using the greater amount of the treatment composition ≥1 volume % should not increase the cost of the treatment process because the same composition can be used repeatedly and the cost will be spread out over the number of times the treatment composition is used.

The treatment process may be conveniently carried out at a temperature and pressure which substantially correspond to standard temperature and pressure, e.g., a temperature of 20-25° C. and a pressure of one atmosphere, but other temperatures and pressures are also suitable. At higher temperatures, e.g., up to 75° C. the $H_2S$ and other targeted contaminants may be released from the contaminated liquid at faster rates than at ambient temperature, but at higher pressures above one atmosphere these contaminants will be released at slower rates from the contaminated liquids. Under such conditions, and regardless of how the treatment composition is provided in the head space of the reaction chamber to react with vapors of $H_2S$ and other contaminants, the concentrated hydroxide(s) contained in the treatment composition quickly reacts with the gasses of $H_2S$ and other sulfur based contaminants released from the liquid being treated and remediates the amounts of $H_2S$ and other contaminants in the contaminated liquids down below 5 ppm in a fairly short time period such as 15 minutes to 3 hours. Again, this is due to the fact that $H_2S$ and other sulfur based contaminants will naturally be released into vapor phase rather than remaining in the contaminated liquids at atmospheric pressure, and are more reactive when in vapor phase. As the vapor phase contaminants react with the treatment composition, additional amounts of the gasses of $H_2S$ and other contaminants will be released from the liquid being treated based on principles of equilibrium and will similarly react with the hydroxide compound(s) in the treatment composition until essentially all of the $H_2S$ and other contaminants are released as gasses from the liquid and are remediated down to safe, acceptable levels such as 5 ppm or less. Hence, the $H_2S$ and other sulfur based contaminants in the treated liquids are fully and quickly remediated by the treatment process of the present invention at least as efficiently as in the treatment processes of PCT/US2018/050913 and PCT/US2018/064015. Further, the elements or other compounds which are generated from the remediated $H_2S$ and other contaminants will tend to stay dissolved in the treated liquids, rather than being released from the liquid as precipitates, scale or the like, particularly if the treatment composition includes components which tend to prevent formation of precipitates, e.g., organic acids such as fulvic acid and humic acid, MEA and EDTA. However, other effects of the treatment process treatment process according to the present invention may be somewhat different from those achieved with the treatment processes of PCT/US2018/050913 and PCT/US2018/064015 as discussed further herein.

For example, the inventors have found that if the vapors from the contaminated liquid and the treatment composition are permitted to further react after the concentration of $H_2S$ and other contaminants is remediated down to concentrations of 5 ppm or less, then the elements or other compounds which are generated from the remediated $H_2S$ and other contaminants may tend to precipitate out of the treated liquids, at least temporarily, but may eventually go back into the treated liquid in remediated, non-toxic form(s), as in the Example below.

Further, when the treatment process of the present invention involves exposing the treatment composition within an open container provided in the reaction chamber as in FIG. 1, based on analyses of the treatment composition as originally provided, as well as after the composition was used for treating contaminated liquids in the treatment process of the present invention, the reactive components of the treatment composition may remain near their original concentrations after the content of $H_2S$ and other contaminants has been remediated down to acceptable levels, even if the original concentrations of $H_2S$ and other contaminants in the treated solutions were relatively high, e.g., concentration of H2S in a range of 20,000-40,000 ppm. This permits such treatment composition to be used again for treating other contaminated liquids. However, each time the treatment composition is used it will lose some of its potency or reactivity, and after the treatment composition has been used a number of times for treating contaminated liquids, the concentrations of components of the treatment composition will gradually be reduced, the pH of the solution will gradually increase, and at some point the treatment composition will not be sufficiently effective for continued use.

On the other hand, when the treatment composition is provided as fine droplets in a gaseous mixture which flows into and possibly circulates through the head space of the vessel as in FIG. 2, while it is not practical to reuse such fine droplets of the treatment composition for treating additional amount(s) of contaminated liquids, far less of the treatment composition is used for such treatment process in comparison to the previously proposed treatment processes of PCT/US2018/050913 and PCT/US2018/064015 in which quantities of the liquid treatment solutions are simply mixed into the contaminated liquids. For example, the amount of treatment composition used in such treatment process according to the present invention may be only 10-50% volume of the amount of the treatment solutions used in the previously proposed treatment processes.

Example of Treatment Process

In an experiment conducted by the inventors, a contaminated diesel fuel containing 40,000 ppm of $H_2S$ as a main contaminant was treated according to the treatment process of the present invention using a treatment composition which corresponds to a treatment solution as disclosed in PCT/US2018/064015, including primarily an aqueous hydroxide solution of NaOH and KOH at a ratio of 97:3 and a total or collective concentration of the hydroxide compounds of about 50 wt %, together with about 1 wt % of each of fulvic acid and monoethanolamine (MEA). One liter of the contaminated diesel fuel was placed in a closed reaction vessel with a head space above the liquid fuel and an open container containing 10 ml of the treatment composition was placed in the reaction vessel such that the treatment composition was exposed within the head space. After 1.5 hours there was less than 1 ppm of $H_2S$ in diesel fuel, as well as in the vapors in the head space of the reaction chamber, and there was no precipitate(s) in the treated diesel fuel. The diesel fuel was then left to further react with the treatment composition and after 4.0 hours total, including the original 1.5 hours, there was still less than 1 ppm of $H_2S$ in diesel fuel, as well as in the vapors in the head space of the reaction chamber, but a significant amount of precipitate(s) were formed in the diesel fuel. Analysis of the precipitate(s) showed that the precipitate(s) were primarily elemental sulfur (S), while analysis of the treated diesel fuel showed that not only did it contain less than 1 ppm $H_2S$, but the total sulfur content of the diesel fuel had been reduced by approximately 50 wt %. The diesel fuel was again left to further react with the treatment composition and after 24.0 hours total, including the prior 4.0 hours, there was still less than 1 ppm of $H_2S$ in diesel fuel, as well as in the vapors in the head space of the reaction chamber, but there was no precipitate(s) in the treated diesel fuel as all of the precipitate(s) that had been present after 4.0 hours had again, been taken up—dissolved into the treated diesel fuel. The treatment composition was analyzed after the 24 hour treatment process, and the analysis shows that each of the components of the composition, hydroxide compounds, fulvic acid and MEA, remained at or near their original concentrations.

The above exemplary embodiment of a treatment method using a treatment composition according to the present invention provides several significant advantages over other known treatment processes for remediating $H_2S$ and other contaminants in liquids. For example, it can quickly and efficiently remediate the $H_2S$ and other contaminants in the liquids and in the head space down to safe, acceptable levels, e.g., ≤1 ppm, within 1-3 hours, and does so while using significantly less of the treatment solution than would be required if the treatment composition was fully mixed into a contaminated liquid according to the inventors' previous proposals. For example, if the treatment composition is disposed in an open container for contact with gasses of $H_2S$ and other contaminants in the head space of the closed vessel, the components of the treatment composition will typically remain at or near their original concentrations after the content of $H_2S$ and other contaminants has been remediated down to acceptable levels, even if the original concentrations of $H_2S$ and other contaminants in the treated solutions were relatively high, e.g., concentration of $H_2S$ in a range of 20,000-100,000 ppm. This permits such treatment composition to be used again for treating additional amounts of contaminated liquids, although after the treatment composition has been used a number of times for treated contaminated liquids, the concentrations of components of the treatment composition will gradually be reduced, the pH of the solution will gradually increase, and at some point the treatment composition will not be sufficiently effective for continued use.

Similarly, if the treatment method involves applying the treatment composition in a gaseous mixture containing fine droplets of the treatment composition which flows into the head space of the closed vessel, the amount of the treatment composition required for remediating the $H_2S$ and other contaminants in the liquids being treated may be far less than 1% volume of the amount of the contaminated liquid, e.g. 0.005-0.01% volume.

Another advantage, is that the treatment composition containing sodium hydroxide (NaOH) and potassium hydroxide (KOH) in approximately equal weight percentages is unexpectedly much more reactive than a similar treatment solution containing the same total concentration of these hydroxides in a range of 35-55 wt %, but in a ratio of 80% NaOH/20% KOH.

The foregoing description is given for clearness of understanding only, and no unnecessary limitations should be understood therefrom, as modifications within the scope of the invention may be apparent to those having ordinary skill in the art and are encompassed by the claims appended hereto.

We claim:

1. A treatment process for remediating $H_2S$ and other contaminants in contaminated liquids comprising steps of:
   disposing an amount of a contaminated liquid containing ≥5 ppm $H_2S$ in a vessel of a closed remediation system such that the liquid partially fills the vessel and a head space is defined within the vessel above the liquid where vapors from the liquid collect;
   providing a treatment composition in the head space such that the vapors from the liquid may contact the treatment composition; and
   permitting the contact between the vapors from the liquid and the treatment composition to continue until a collective concentration of $H_2S$ in the liquid and in the head space is <5 ppm, wherein the treatment composition includes an aqueous hydroxide solution containing at least one hydroxide compound, a collective concentration of the at least one hydroxide compound in the aqueous hydroxide solution is in a range of 35-55 weight %, and the aqueous hydroxide solution constitutes at least 80 weight % of the treatment composition.

2. The treatment process according to claim 1, wherein the the treatment process is carried out at a temperature of 10 to 75° C. and a pressure of 0.5 to 5 atmospheres.

3. The treatment process according to claim 1, wherein the aqueous hydroxide solution constitutes at least 90 weight % of the treatment composition.

4. The treatment process according to claim 3, wherein the treatment composition further includes at least one of fulvic acid and humic acid, and collectively the at least one of fulvic acid and humic acid constitutes 0.01-4 wt % of the treatment composition.

5. The treatment process according to claim 3, wherein the aqueous solution includes equal amounts of sodium hydroxide (NaOH) and potassium hydroxide (KOH), and an amount of the treatment composition provided in the head space is ≤1% volume of the amount of the contaminated liquid.

6. The treatment process according to claim 1, wherein the treatment, composition further includes at least one of a chelating agent, a surfactant and a buffering agent.

7. The treatment process according to claim 6, wherein the chelating agent is ethylenediaminetetraaceticacid (EDTA), and the treatment composition includes 0.5 to 50.0 ml EDTA/liter of treatment, composition.

8. The treatment process according to claim 1, wherein the step of providing the treatment composition in the head space involves placing the treatment solution in an open container and disposing the open container with the treatment composition in the vessel such that the vapors from the liquid as collected in the head space may contact the treatment composition.

9. The treatment process according to claim 1, wherein the system also includes a supply of the treatment composition separate from the vessel, and the step of providing the treatment composition in the head space involves forming a gaseous mixture containing fine droplets of the treatment composition from the supply of the treatment composition and flowing the gaseous mixture into the head space of the closable vessel.

10. The treatment process according to claim 9, wherein the system further includes a device which generates the mixture containing fine droplets of the treatment composition and which is in fluid communication with the head space of the vessel,and the method includes further steps of withdrawing at least some of the gaseous mixture containing fine droplets of the treatment composition from the head space, and re-circulating the withdrawn gaseou mixture back into the headspace.

11. The treatment process according to claim 1, wherein the contaminated liquid further includes $CO_2$ as another contaminant.

* * * * *